(12) United States Patent
Childress et al.

(10) Patent No.: US 7,957,413 B2
(45) Date of Patent: Jun. 7, 2011

(54) METHOD, SYSTEM AND PROGRAM PRODUCT FOR OUTSOURCING RESOURCES IN A GRID COMPUTING ENVIRONMENT

(75) Inventors: Rhonda L. Childress, Austin, TX (US); Catherine Helen Crawford, Carmel, NY (US); David Bruce Kumhyr, Austin, TX (US); Paolo Franco Magnone, Palisades Park, NJ (US); Neil R. Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 1341 days.

(21) Appl. No.: 11/101,609

(22) Filed: Apr. 7, 2005

(65) Prior Publication Data
US 2006/0227810 A1 Oct. 12, 2006

(51) Int. Cl.
*H04J 3/16* (2006.01)
*G06F 15/16* (2006.01)
*G06F 15/173* (2006.01)
(52) U.S. Cl. ......... 370/465; 709/205; 709/225; 709/229
(58) Field of Classification Search ............. 370/395.21, 370/395.41, 464, 465, 468, 477
See application file for complete search history.

(56) References Cited

U.S. PATENT DOCUMENTS

| | | | |
|---|---|---|---|
| 4,769,771 A | 9/1988 | Lippmann et al. ............ 364/200 |
| 5,548,518 A | 8/1996 | Dietrich et al. .......... 364/468.06 |
| 6,009,275 A | 12/1999 | Dekoning et al. | |
| 6,108,662 A | 8/2000 | Hoskins et al. ............... 707/102 |
| 6,182,109 B1 | 1/2001 | Sharma et al. ................ 709/104 |
| 6,263,382 B1 | 7/2001 | Bartlett et al. .................. 710/10 |

(Continued)

FOREIGN PATENT DOCUMENTS

WO 0231672 A2 4/2002

OTHER PUBLICATIONS

Nartovich et al., "WebSphere Application Server Enterprise Edition 4.0, A Programmer's Guide", International Business Machines Corporation, Redbooks, ibm.com/redbooks, Feb. 2002, 258 pages.

(Continued)

*Primary Examiner* — Kevin C Harper
*Assistant Examiner* — Christine Duong
(74) *Attorney, Agent, or Firm* — Yee & Associates, P.C.; Jeffrey S. LaBaw

(57) ABSTRACT

A technique for efficiently processing resource allocation requests in an on-demand environment. When a user logs into a resource allocation request manager, various resource requirements entered are immediately sent to a remote resource manager to allow for dynamic, real-time feedback to the user who is entering the resource requirements as to any issues or concerns regarding the requested resource(s) or plug-in element(s), such as lack of availability. The user can thus reconfigure or otherwise modify the various resource requests based on this feedback to optimize the overall resource allocation request. This also allows an organization providing services such as computer hosting services to re-allocate resources in advance if a new resource request would exceed a service level agreement outlined in advance with a customer, thereby improving resource planning in a data center environment. In addition, the dynamic feedback on the new resource request that exceeds a service level agreement can be used to develop a new service level agreement or temporary service offer that addresses the unique resource condition.

9 Claims, 5 Drawing Sheets

U.S. PATENT DOCUMENTS

| | | | |
|---|---|---|---|
| 6,381,682 B2 | 4/2002 | Noel et al. | 711/153 |
| 6,633,916 B2 | 10/2003 | Kauffman | 709/229 |
| 6,738,974 B1 | 5/2004 | Nageswaran et al. | 719/104 |
| 6,785,675 B1 | 8/2004 | Graves et al. | |
| 7,406,664 B1* | 7/2008 | Morton et al. | 715/809 |
| 7,463,648 B1* | 12/2008 | Eppstein et al. | 370/468 |
| 7,693,962 B2* | 4/2010 | Serlet et al. | 709/219 |
| 2001/0029519 A1 | 10/2001 | Hallinan et al. | |
| 2001/0029525 A1 | 10/2001 | Lahr | 709/218 |
| 2002/0010761 A1* | 1/2002 | Carneal et al. | 709/219 |
| 2002/0091826 A1* | 7/2002 | Comeau et al. | 709/226 |
| 2003/0191677 A1 | 10/2003 | Akkiraju et al. | |
| 2004/0015591 A1* | 1/2004 | Wang | 709/228 |
| 2004/0025164 A1 | 2/2004 | Ma et al. | 718/107 |
| 2004/0142683 A1* | 7/2004 | Clark et al. | 455/418 |
| 2005/0089063 A1* | 4/2005 | Haruna et al. | 370/468 |
| 2005/0102674 A1* | 5/2005 | Tameshige et al. | 718/100 |
| 2006/0075042 A1* | 4/2006 | Wang et al. | 709/206 |
| 2006/0143617 A1* | 6/2006 | Knauerhase et al. | 718/104 |
| 2007/0094665 A1* | 4/2007 | Jackson | 718/104 |

OTHER PUBLICATIONS

"IBM WebSphere Application Server Version 4.1, Enterprise Edition", International Business Machines Corporation, Somers, New York, 2002, 7 pages.

* cited by examiner

*FIG. 1*
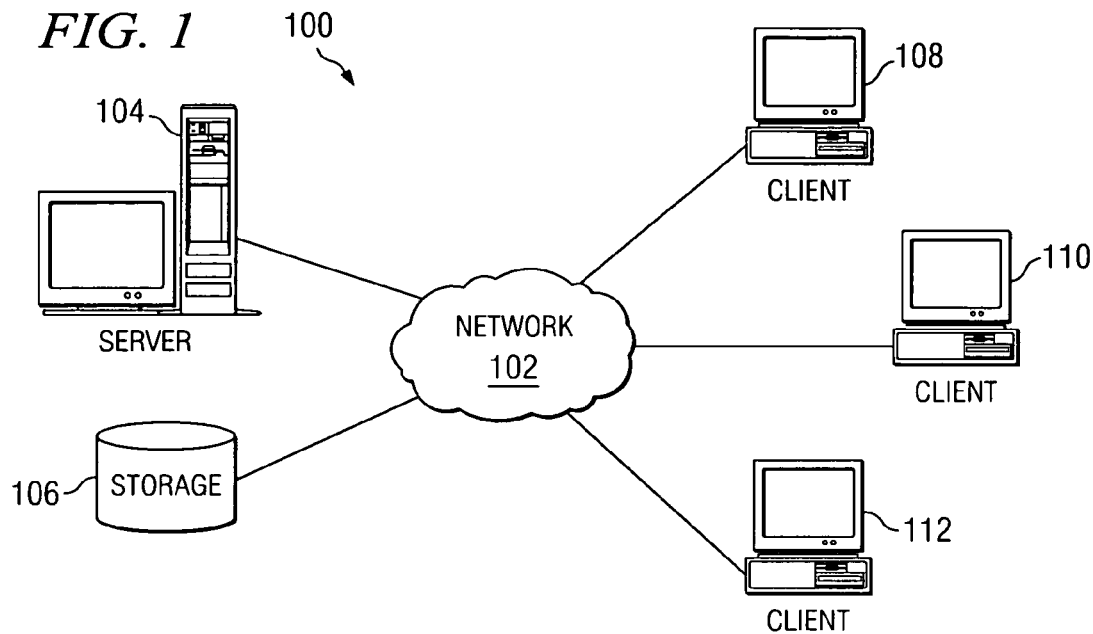
*FIG. 2*
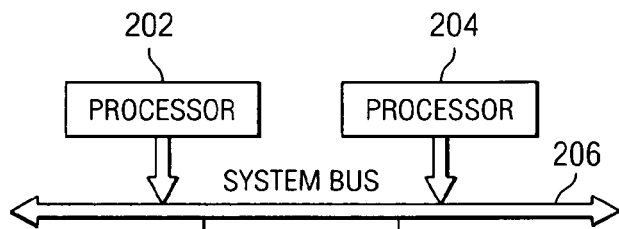
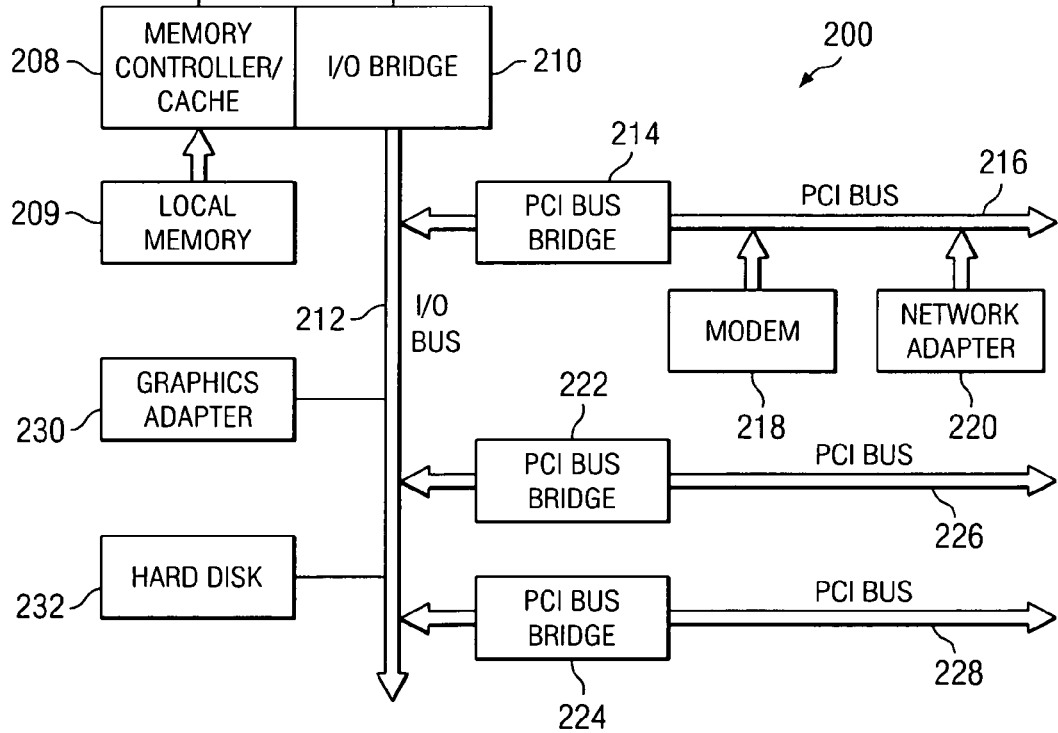

METHOD, SYSTEM AND PROGRAM PRODUCT FOR OUTSOURCING RESOURCES IN A GRID COMPUTING ENVIRONMENT

BACKGROUND OF THE INVENTION

1. Technical Field

The present invention relates to resource management in a data processing system, and more particular relates to real-time analysis of resource availability when generating a comprehensive resource request for remote resource fulfillment.

2. Description of Related Art

In today's highly competitive, global economic climate, many companies are resorting to outsourcing certain operations to other companies and/or countries in an effort to control costs. A user/customer that desires such outsourcing must work with a supplier (outsourcer) to define and manage the work to be outsourced.

Grids are environments that enable software applications to integrate instruments, displays, computational and information resources that are managed by diverse organizations in widespread locations. Grid computing is all about sharing resources that are located in different places based on different architectures and belonging to different management domains. Computer grids create a powerful pool of computing resources capable of running the most demanding scientific and engineering applications required by researchers and businesses today.

The above described outsourcing environments are evolving to include a Grid computing model where users request remote resources to be allocated dynamically. However, today's technology usually requires significant advanced reservation, e.g. days to weeks. In these scenarios, a maintenance level service agreement may be in place between the customer and the supplier (the outsourcer) whereby the customer will only have access to certain resources to compensate for overload scenarios such as periods in which the local customer resources are over-utilized and additional work must be pushed off-site. However, current service level agreements (SLAs) are typically very static. In order for suppliers to adequately plan and architect a collection of resources, e.g. firewalls, network partitioning, etc., customers ask for a specific set of resources and are not given access to any resources that do not match that type, or even a certain class of service like security. The customer does not have access to an "open environment" behind the supplier's firewall. In addition, a resource request in such an environment is often a fairly complex description of requirements (hardware, software, networks, etc.) which must be parsed in its entirety before any decisions can be made about available resource pools, pricing, and time to allocate such resources. In this type of on-demand environment, it would be desirable to process resource allocation requests more efficiently with a dynamic resource request system, where the SLAs can become more generalized and more resource options may become available.

SUMMARY OF THE INVENTION

The present invention provides a method, system and program product for efficiently processing resource allocation requests in an on-demand or real-time environment. Such efficiency is achieved by not just parsing hierarchical levels of resource requests by a remote resource manager, but in addition by also receiving the requests by such remote resource manager as they are entered by a user/requester. When a user logs into a resource allocation request manager, various resource requirements entered are immediately sent to a remote resource manager to allow for dynamic feedback to the user who is entering the resource requirements as to any issues or concerns regarding the requested resource(s) or plug-in element(s), such as lack of availability. The user can thus reconfigure or otherwise modify the various resource requests based on this feedback to optimize the overall resource allocation request. This also allows an organization providing services such as computer hosting services to re-allocate resources in advance if a new resource request would exceed a service level agreement outlined in advance with a customer, thereby improving resource planning in a data center environment. In addition, the dynamic feedback on the new resource request that exceeds an SLA can be used to develop a new SLA or temporary service offer that addresses the unique resource condition.

To achieve the above, a hierarchical description of an atomistic resource model is provided, from which a resource request may be generated. A discrete signal system is provided which generates a resource request, responsive to user interaction with the system, to a remote resource manager. A plug-in is provided to the remote resource manager to handle the dynamic, partially built requests. If a user deletes or decommits a field, a signal is dynamically sent to the remote resource manager to de-commit resources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a diagram illustrating a distributed data processing system according to the present invention.

FIG. 2 is an exemplary block diagram of a server according to the present invention.

DETAILED DESCRIPTION OF THE PREFERRED EMBODIMENT

Figure 3:
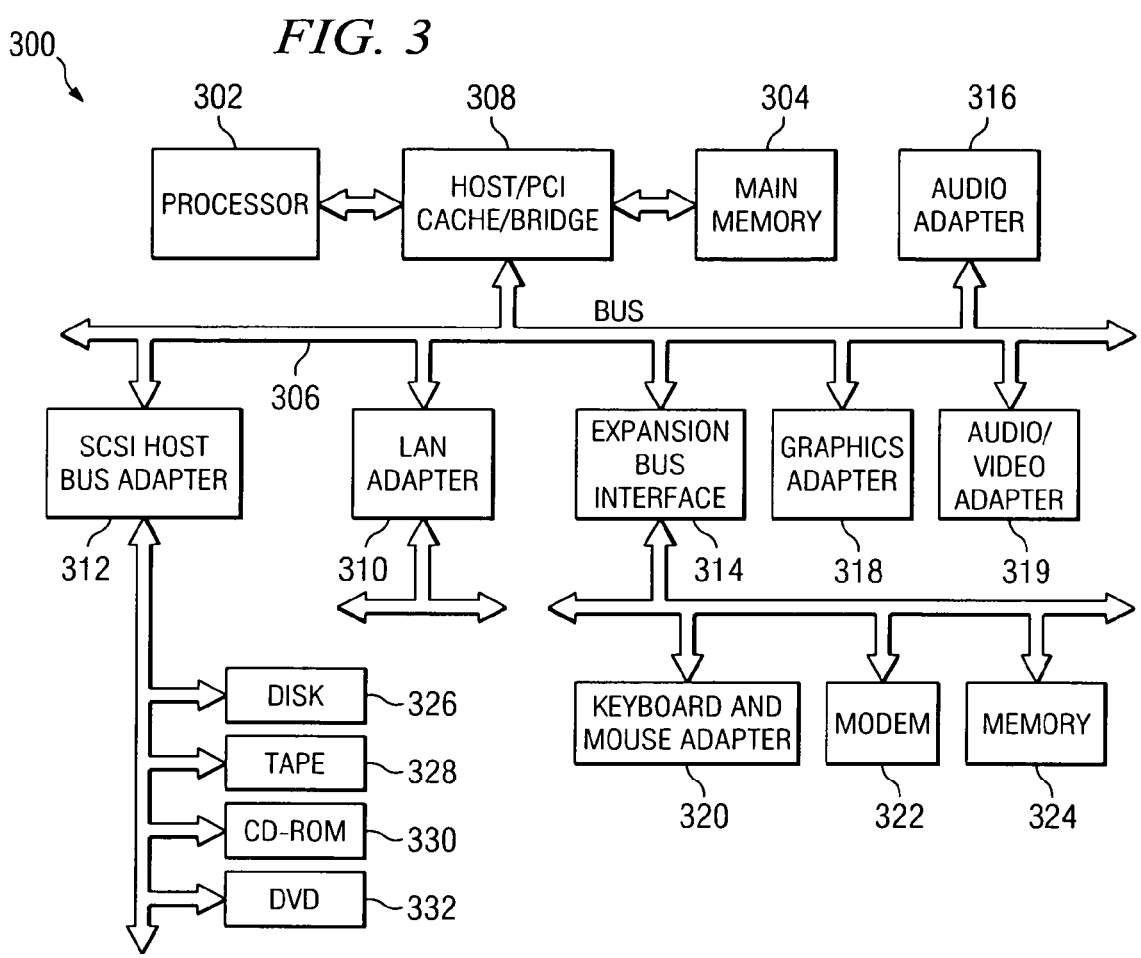
FIG. 3 is an exemplary block diagram of a client according to the present invention.

With reference now to the figures, FIG. 1 depicts a pictorial representation of a network of data processing systems in which the present invention may be implemented. Network data processing system 100 is a grid network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides resources, such as operating system images, applications or access to hardware resources, to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
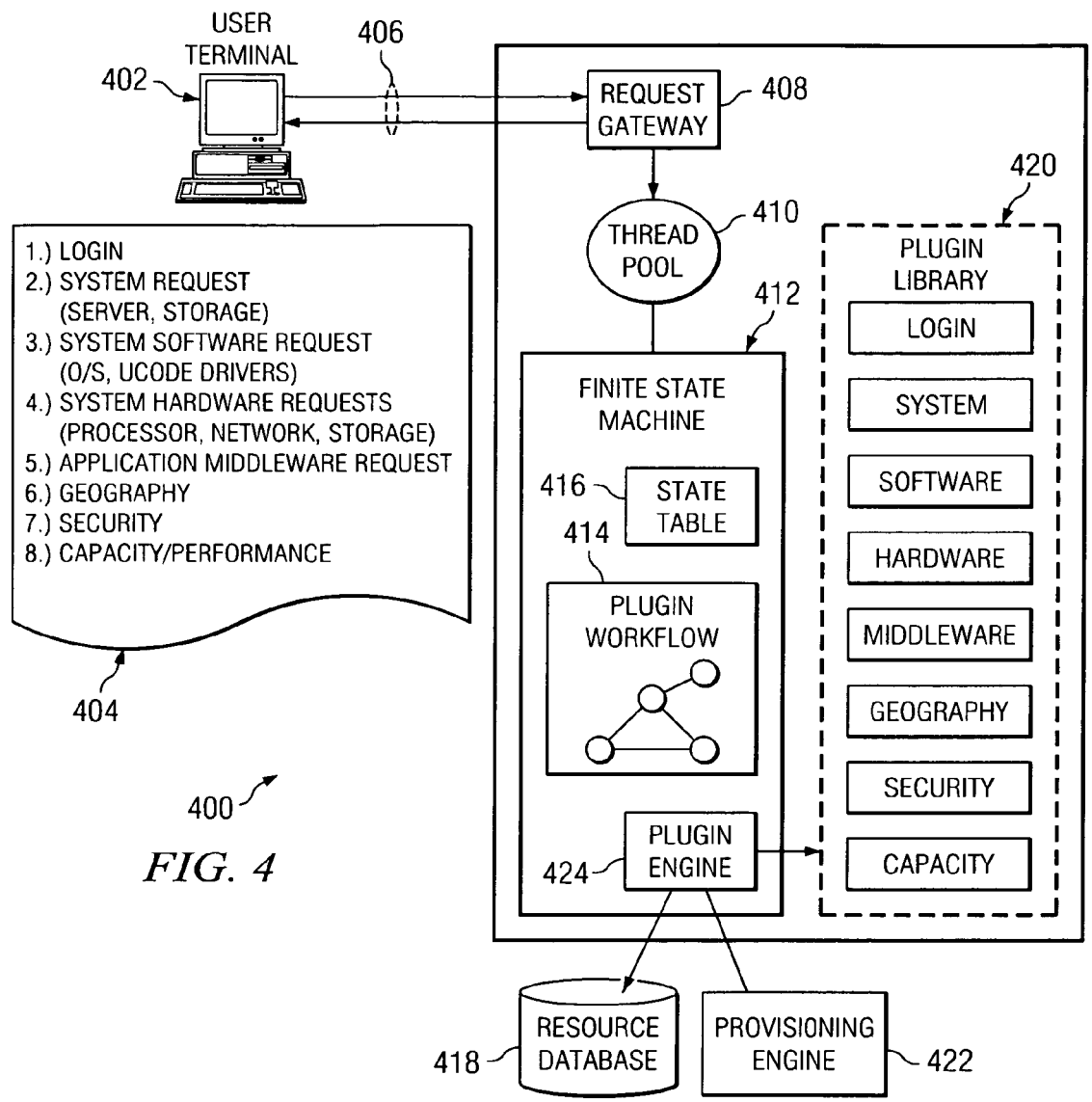
FIG. 4 is an exemplary overall architecture of a resource request and fulfillment system.

Referring now to FIG. 4, there is shown at 400 a system for requesting resources in a distributed computing environment in accordance with the present invention. A user request is input by a user using terminal 402, which may part of or attached to a client device such as client 108 shown in FIG. 1. The user request may be any of a plurality of different types of requests, such as those shown in block 404, and may include a login request, a system-level request for systems such as servers or storage, a system software request for software such as an operating system (O/S), microcode (ucode) or device/adapter driver(s), a system hardware request for hardware such as a processor, network or storage, an application middleware request, a geography request, a security request, and a capacity/performance request. The user request is transmitted across path 406, which may be implemented as a network such as network 102 shown in FIG. 1, to a request gateway 408, which may be implemented by a server such as server 104 shown in FIG. 1. At the request gateway, a thread is created from thread pool 410, and this thread creates a finite state machine (FSM) 412 in the request gateway 408 to handle subsequent signals and errors such as request signals from the user and allowed/disallowed resource allocation attempts. The finite state machine 412 dynamically creates a plug-in workflow 414 which manages, in conjunction with the state table 416, different states of the request, including error conditions. The finite state machine uses a resource database 418 to determine if requested resources are available, and to temporarily commit resources until all signals in the request have been received. Plug-ins to translate requirements and coordinate with the provisioning engine 422 are dynamically executed within a runtime engine 424 in the finite state machine. These plug-ins are shown at 420 and are a part of a plug-in library. These plug-ins may provide functions such as Login, System Request (e.g. server, storage), System Software Request (e.g. operating system, microcode, drivers), System Hardware Request (e.g. processor, network, storage), Application Middleware Request, Geography, Security and Capacity/Performance, as shown at 420. An error or unavailable signal can be generated at any point based upon the state of the user request.

Figure 5:
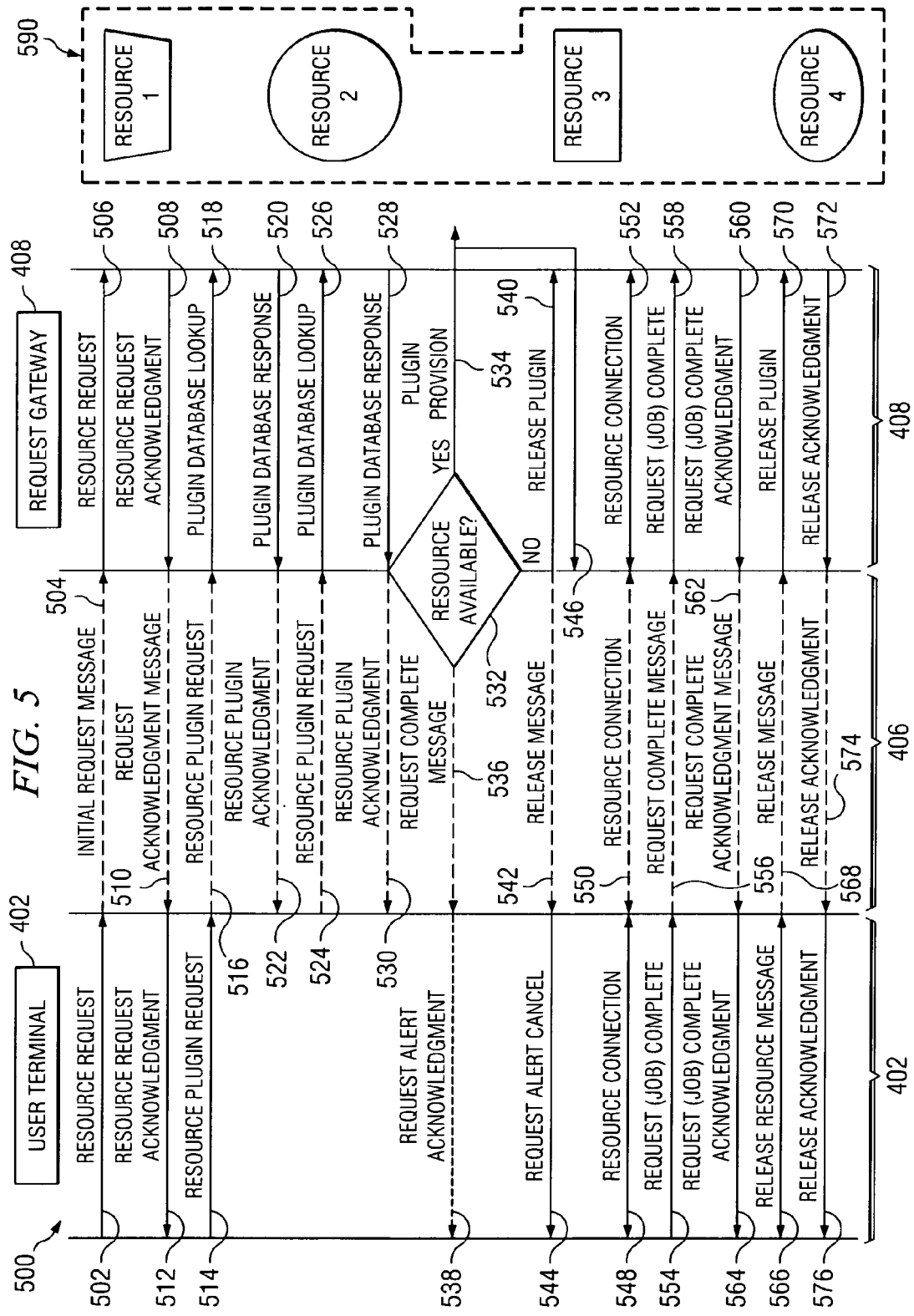
FIG. 5 is an exemplary message interchange between a resource requestor application running on a user/client device and a remote resource manager running on a server.

Turning now to FIG. 5, a representative series of signals or transactions that flow between a user terminal such as 402 and a request gateway such as 408 are shown at 500. In this scenario, a user is generating a conglomerate resource request file or model, and inputs individual resource requests which are received at user terminal 402 and merged into a conglomerate resource request template (not shown). Responsive to receiving a first of many requests, a first resource request is signaled at 502. This signal causes an initial request message to be generated and transmitted to the request gateway at 504. This initial request message is received by the Request Gateway 408 at 506, and an acknowledgement is signaled by the request gateway at 508. This signal causes a request acknowledgement message to be transmitted across the network at 510, where it is received by the user terminal at 512. This initial resource request could be a login command, for example. The specific n plug-in resources are then sequentially transmitted to the request gateway, as initiated at 514. The sequential transmission of individual resources is done even when using a conglomerate template. An example of this interplay between transmission of individual resources and a client conglomerate template is provided by the IBM WebSphere Application Server, available from International Business Machines Corporation, Armonk, N.Y. Business Gateway. The first of these plug-in requests is transmitted at 516, and received by the request gateway where the plug-in database/library, such as that shown at 420 in FIG. 4, is queried or looked-up to determine availability of such plug-in resource at 518. A status response is sent by the request gateway at 520 and transmitted across network 406 at 522. Responsive to receiving this response, a gateway client (not shown, but further described below) then sequentially signals a request for the next 2 to n plug-in requests at 524 in similar fashion to the first plug-in request, and the request gateway 408 processes these in the same manner as the first request at 526 and 528, with resulting acknowledgements being signaled back to the requester at 530. The gateway client is an executable which is acting on behalf of the user/requestor to integrate into the dynamic request system, aggregates the received responses and presents the appropriate information to the user. Such client executable does not have to reside or execute on the requestor's machine, but rather has to act on behalf of the requestor as it processes responses and presents information to the requestor. An example of such a client would be a Java applet. Representative plug-in resources are shown at 590 in FIG. 5.

As resource plug-in requests are received by request gateway 408, and responsive to a determination being made at 532 on whether the requested resource is available, the plug-in is either provided at 534 if available, or the plug-in reservation request is released at 540 if not available. If available, a signal is generated at 546 (for inclusion in the response message that is subsequently sent across resource connection 550 and 548). If the resource is not available and has been released, a release message is sent to the requestor at 542, resulting in an alert message at the user terminal indicating that the resource request has been cancelled at 544. This alert message advantageously provides for dynamic, real-time feedback of resource status from a remote resource manager, enabling the user/requestor to adjust their overall resource request package to account for such resource plug-in unavailability.

Once all resource requests have been processed, the resource connection is provided by 548, 550 and 552 to provide the requested sources, which are remotely provided in the grid computer environment in the preferred embodiment, to the requester/customer who is outsourcing such requested resources. Once the outsourced service or job has completed, the user terminal signals a job complete request at 554, resulting in a request complete message being sent at 556, and received by the request gateway at 558. The gateway 408 signals an acknowledgement at 560, resulting in an acknowledgement message being sent to the user/requester terminal at 562, and received at 564. The resource allocation request manager application running at user terminal 402, responsive to the job complete request acknowledgement signal being received at 564, signals a release resource message at 566, which is sent across the network at 568 and results in the request gateway releasing the 1-n plug-ins relating to this completed job at 570. The request gateway acknowledges the release at 572, which is sent to the user terminal at 574 and received at 576 to thereby end the current outsourced job.

This dynamic resource allocation scheme advantageously allows an organization providing services such as computer hosting services to re-allocate resources in advance if a service level agreement with a customer would otherwise be in violation without such re-allocation, thereby improving resource planning in a data center environment.

Figure 6:
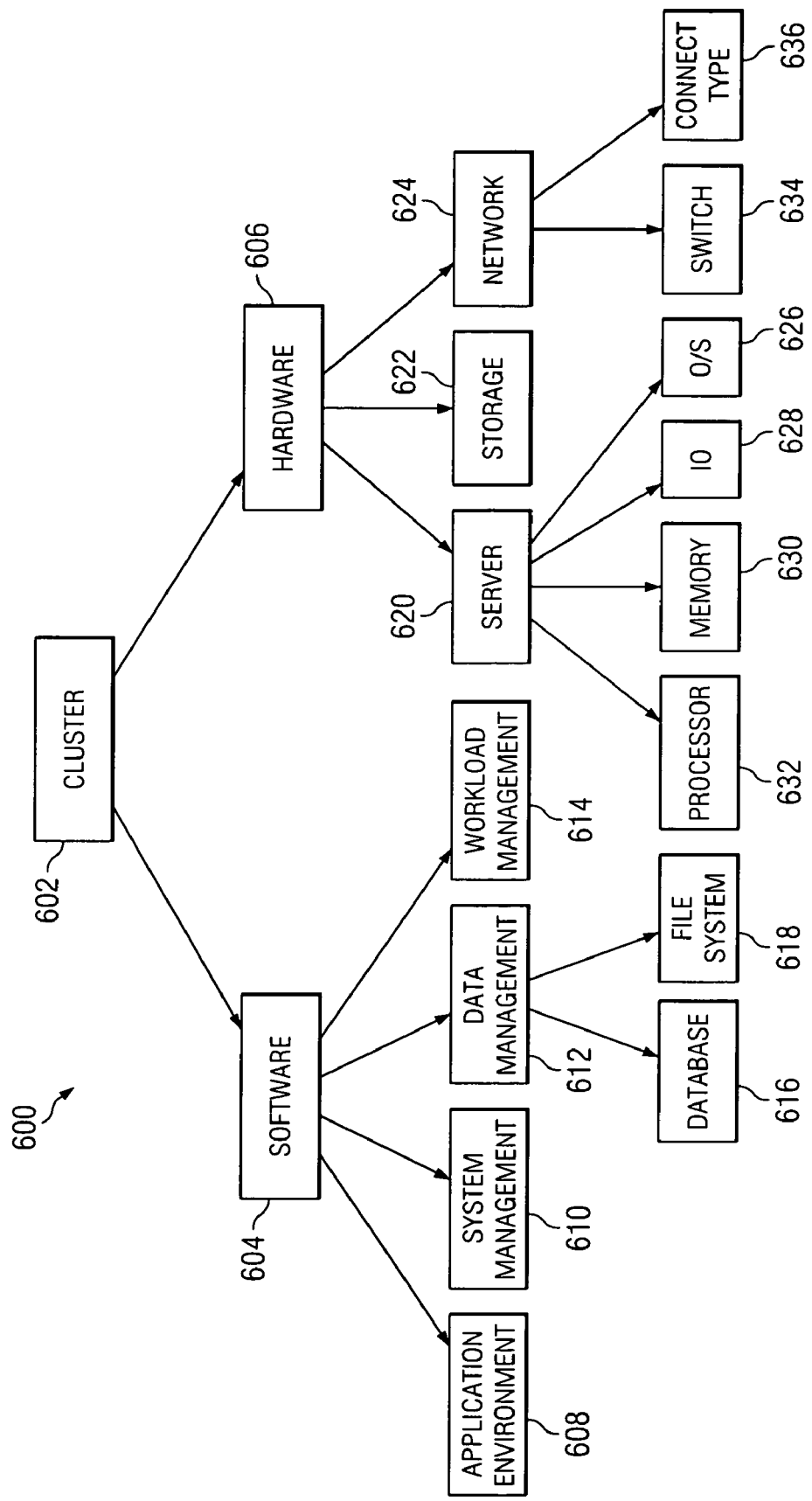
FIG. 6 is an exemplary hierarchical resource model.

To facilitate the above data flow, a hierarchical description of an atomistic resource model is provided, where several computer systems have a lowest common building block. For instance, as shown in FIG. 6, a cluster 602 is a system built using software 604 and hardware 606. The software 604 is built using an application environment 608, system management 610, data management 612 and workload management 614. Data management 612 is built using one or more databases 616 and one or more file systems 618. The hardware is built using servers, disks, and a network, such as is shown by server(s) 620, storage 622 and network 624. It is probably difficult to define disks beyond a certain capacity, so storage 622 is considered to be an atomistic resource. Alternatively, if a multitude of heterogeneous storage devices were provided, such as disk storage devices and tape storage devices, the storage could be further modeled at a lower level to include both disk and tape storage devices, which themselves could be considered to be an atomistic resource. Server 620 and network 624 can be described with even further detail. A server 620 may be described using operating system 626, I/O 628, on board memory 630, and processor 632. A network may be described by a switch 634 and the type of connectivity 636. In each of these instances, a hierarchy of atomistic (e.g. processor 632, storage 622, database 616, system management 610) and then compound resources (e.g. software 604 and hardware 606) are used to define the cluster. A plurality of such clusters can be further organized into a multi-cluster implementation (not shown), for use in a grid computing environment.

Furthermore, this hierarchical model is expandable to cover different events or responses that may be required in a requested resource/system. For instance, a single event such as "More Capacity is required to execute Application 'A'" can be broken down into several smaller events: (i) "More boxes of type E required", (ii) "More network bandwidth on switch plane 3 required", (iii) "Application J on server 9.2.9.32 must be suspended", which would correspond to a similar set of responses, (iv) "System manager suspending application J on server 9.3.9.32", (v) "Switch configuration updated", (vi) "Linux kernel rebuilt on server 9.3.9.32", which would in total correspond to the aggregated response of "More Application A systems have been allocated and built". Complex responses for resource requests are thus built from fundamental or atomistic responses to the basic building blocks in the system.

An example of a conglomerate template can be seen in FIG. 4. In this figure, the template is depicted on the client side (at 404), which has been built by a user constructing various portions of a resource request. On the server or system side 408, a conglomerate is reconstructed by receiving pieces of this request and then using the appropriate plug-ins as determined by the finite state machine to dynamically assemble the resource request. Although in the preferred embodiment the conglomerate is not required to be assembled in its entirety on the server side before the plug-ins execute, a historical trace of the actions that were taken by the plug-ins can be used to reconstruct the conglomerate on the server side.

Thus, there is provided an improved technique for efficiently processing resource allocation requests in an on-demand environment. Such efficiency is achieved by not just parsing hierarchical levels of resource requests by a remote resource manager, but in addition by also receiving the requests by such remote resource manager as they are entered by a user/requester. When a user logs into a resource allocation request manager, various resource requirements entered are immediately sent to a remote resource manager to allow for feedback to the user entering the resource requirements as to any issues or concerns regarding the requested resource(s), such as lack of availability. The user can thus reconfigure or otherwise modify the various resource requests based on this feedback to optimize the overall resource allocation request.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for on-demand processing of resource requests, comprising the steps of:

receiving a hierarchical resource request from a user in real time, wherein the hierarchical resource request comprises a plurality of resource requests;

identifying atomistic resources associated with the hierarchical resource request;

determining availability of the atomistic resources;

signaling the user if at least one of the atomistic resources is currently unavailable while receiving the hierarchical resource request from the user in real time; and initiating a process for processing the received resource requests, wherein the process is a finite state machine that uses a resource database to determine if the received requested resources are available, wherein the finite state machine dynamically creates a plug-in workflow which manages, in conjunction with a state table, different states of a given resource request including error conditions associated with such given resource request.

2. The method of claim 1, wherein the process temporarily commits resources until all signals for a given resource request have been received, wherein the resources are provided by a plug-in library comprising a plurality of plug-in modules that each provide functionality for a given resource of the resources.

3. A method for real-time processing of resource requests, comprising the steps of:

responsive to a user action, providing a hierarchical description of an atomistic resource model and signaling a resource request comprising the hierarchical description to a data processing system;

parsing the hierarchical description by the data processing system and invoking at least one module within the data processing system that is operable to fulfill the resource request;

wherein the at least one module is a plug-in module, and further comprising:

determining if the resource request can be fulfilled by the plug-in module; and signaling a resource fulfillment status to the user.

4. The method of claim 3, further comprising a step of using a finite state machine and a resource database for determining if a received resource request is available, wherein the finite state machine dynamically creates a plug-in workflow which manages, in conjunction with a state table, different states of a given resource request including error conditions associated with such given resource request.

5. The method of claim 3, further comprising a step of responsive to receiving, by the user, the resource fulfillment status, modifying the hierarchical description and signaling another resource request comprising the modified hierarchical description to the data processing system.

6. An apparatus for on-demand processing of resource requests, comprising:

means for receiving a hierarchical resource request from a user in real time, wherein the hierarchical resource request comprises a plurality of resource requests;

means for identifying atomistic resources associated with the hierarchical resource request;

means for determining availability of the atomistic resources;

means for signaling the user if at least one of the atomistic resources is currently unavailable while receiving the hierarchical resource request from the user in real time; and means for processing received resource requests, wherein the means for processing uses a resource database to determine if a received requested resource is available, wherein the means for processing is a finite state machine that dynamically creates a plug-in workflow which manages, in conjunction with a state table, different states of a given resource request including error conditions associated with such given resource request.

7. The apparatus of claim 6, wherein the means for processing temporarily commits resources until all signals for a given resource request have been received, wherein the resources are provided by a plug-in library comprising a plurality of plug-in modules that each provide functionality for a given resource of the resources.

8. A system for real-time processing of resource requests by a data processing system, comprising:

a hierarchical description of an atomistic resource model;

a process for parsing the hierarchical description and invoking at least one plug-in module within the data processing system that is operable to fulfill the resource request;

a process for determining if the resource request can be fulfilled by the at least one plug-in module, and signaling a resource fulfillment status to the user.

9. The system of claim 8, wherein the process comprises a state machine that uses a resource database to determine if a received resource request is available, wherein the finite state machine dynamically creates a plug-in workflow which manages, in conjunction with a state table, different states of a given resource request including error conditions associated with such given resource request.

* * * * *